United States Patent [19]

Beauviala

[11] Patent Number: 4,893,921
[45] Date of Patent: Jan. 16, 1990

[54] PROCESS FOR RECORDING CODED INFORMATION ON THE MARGINAL PART OR A PERFORATED CINEMATOGRAPHIC FILM

[75] Inventor: Jean-Pierre Beauviala, Grenoble, France

[73] Assignee: AATON R.G., Grenoble, France

[21] Appl. No.: 256,869

[22] Filed: Oct. 12, 1988

[30] Foreign Application Priority Data

Oct. 30, 1987 [FR] France .................................. 87 15098

[51] Int. Cl.$^4$ .............................................. G03B 21/50
[52] U.S. Cl. .......................................... 352/92; 352/5; 352/20
[58] Field of Search ........................ 352/92, 236, 20, 5; 355/40, 41

[56] References Cited

U.S. PATENT DOCUMENTS 3,179,924  4/1965  Auyang et al. .
4,659,198  4/1987  Beauviala et al. .................... 352/92

FOREIGN PATENT DOCUMENTS 2571513  3/1971  France .
2161425  2/1978  United Kingdom .

Primary Examiner—Monroe H. Hayes
Attorney, Agent, or Firm—McAulay Fisher Nissen & Goldberg

[57] ABSTRACT

On the marginal part of a perforated cinematographic film, are recorded coded information or "addresses" associated respectively with the various images of the film, in the form of dots disposed in a matrix of longitudinal rows and of transverse columns. Before each matrix of dots corresponding to a group of coded information or "address" of an image, a transverse framing pattern constituted by a single combination of dots, is recorded. Then, during the recording, in the different transverse columns, of the different successive characters constituting the same "address", a longitudinal framing pattern is recorded, along a longitudinal row bordering the matrix, this longitudinal framing pattern being constituted by an alternation, along said row, of dots and absences of dots aligned respectively with the various transverse columns of the matrix. The dots are recored on the film by means of a recording device constituted by a transverse assembly of adjacent light sources illuminating the film respectively at the location of each longitudinal row. In order to form the dots on the film, the light sources are energized by pairs of adjacent sources so as to form on the film, for each element of information, a transverse dot occupying the location of two longitudinal rows, in other words having a length of a pitch corresponding to the total width of two adjacent rows. The successive groups of information or "addresses" are recorded, offsetting them alternately by a half-pitch in the transverse direction.

1 Claim, 1 Drawing Sheet

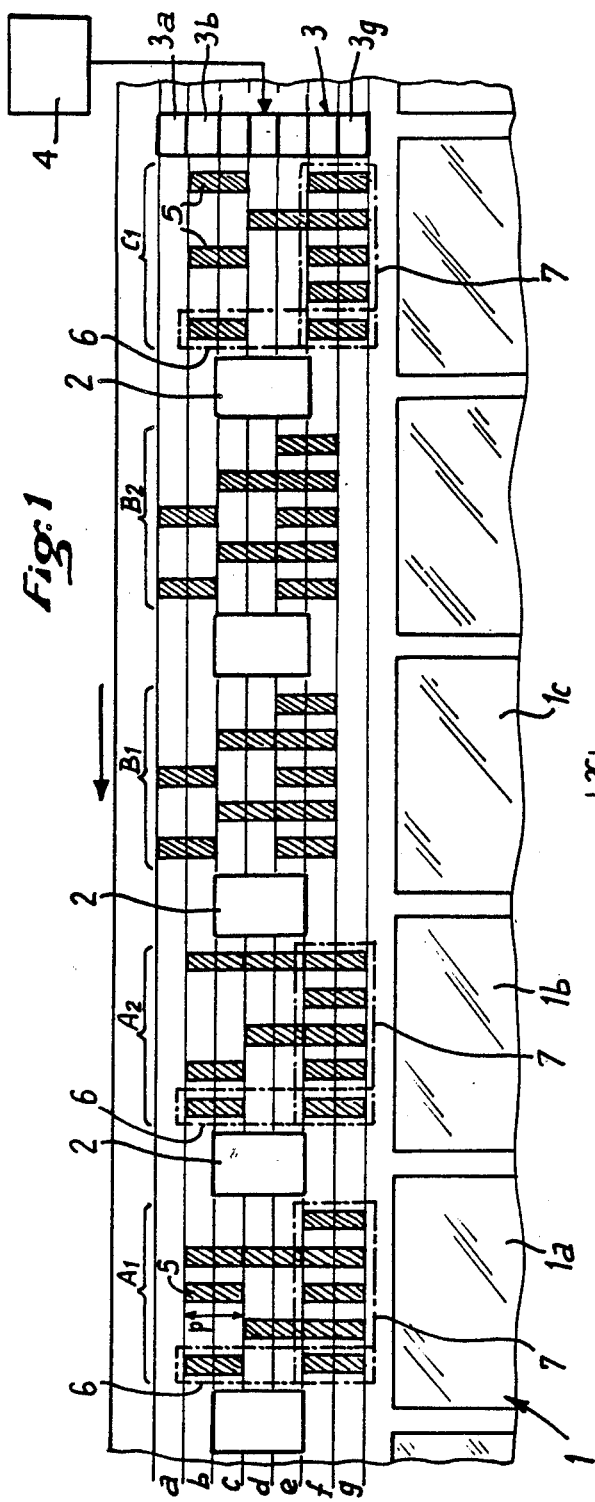
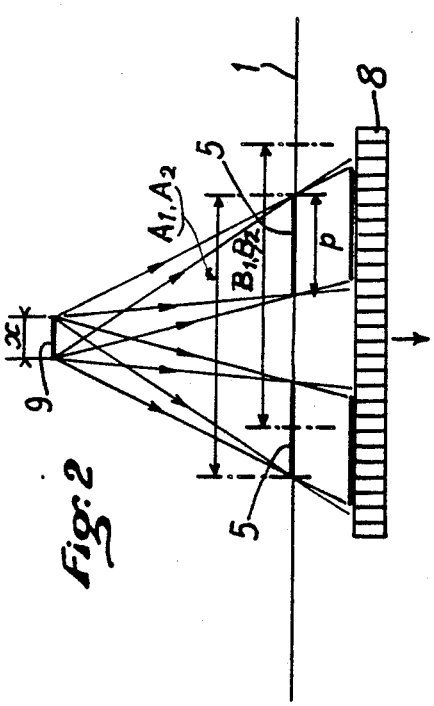
Fig. 1
Fig. 2

PROCESS FOR RECORDING CODED INFORMATION ON THE MARGINAL PART OR A PERFORATED CINEMATOGRAPHIC FILM

FIELD OF THE INVENTION

The present invention relates to a process for recording coded information on the marginal part of a perforated cinematographic film.

BACKGROUND OF THE INVENTION

When shooting a cine film, it is conventional practice to record in the marginal part of the film, between the successive perforations in the case of a 16 mm film, or outside these perforations in the case of a 35 mm film, coded information which corresponds to the conditions in which the corresponding filmed sequences were shot. Such information may be relative, for example, to the time of shot-taking, to the camera used, to the diaphragm employed, to the lens used, etc.

The information concerning the time is used in particular for ensuring, during projection of the cine film, synchronization of the advance of this film with that of a sound recording support on which the sound corresponding to the different shot-taking sequences was recorded, independently, during shooting.

In the process of recording coded information described in U.S. Pat. No. 4,659,198, every information associated with an image is recorded in the form of a matrix assembly of dots or "optical bits" which are recorded on the marginal part of the film, distributed in a matrix comprising for example seven longitudinal columns and thirteen transverse rows. To ensure subsequent synchronization, it is also provided, in this process, to record, before each matrix of dots or "optical bits" corresponding to a group of coded information, a transverse framing pattern constituted by a single combination of dots which is different from all the combinations corresponding to the different information characters, then, during recording of the different successive characters constituting the same group of coded information, a longitudinal framing pattern, along a longitudinal for bordering the matrix, this longitudinal framing pattern being constituted by an alternation, along said row, of dots and absences of dot aligned respectively with the various columns of the matrix in which successive characters are recorded.

With such a system of recording coded information on a cine film, it is necessary, when this film is being projected, to use a device for reading the dots or "optical bits" in order to ensure synchronization of the film with the sound recording support such as a magnetic tape or a compact disc. Such synchronization is permanently ensured by comparing the coded information associated with each image and defining an "address" relative to this image, with a corresponding "address" on the sound recording support. This support, servo-controlled by the advance of the film, may also bear in coded form the contents of sub-titles or other events which it is desired to show around or within the screen during projection of the images. In this way, several sound versions, in different languages, and corresponding sub-titles may be associated with a film. Consequently, if original images of the film are absent, due to a cut of this film and subsequent connection thereof, this absence of image is immediately detected and the servo-control device automatically accelerates the sound recording support in order to make up the delay and ensure that the sound emission from the loudspeaker corresponds strictly to the images projected.

A system of projection therefore requires the provision of a reader of the dots or "optical bits" present on the film, which is relatively precise. As the dots or "optical bits" are of very small dimensions, this reader must be very precise and it is generally constituted by a relatively complex assembly comprising, on one side of the film, a lamp and a condenser and, on the other side of the film, a lens to form a clear image of the dots of the coded information or "addresses" on a detector which may for example be of the CCD type.

Furthermore, such a system of projection, with servo-control of the sound recording support by the cine film by comparison of addresses, supposes that all the information coded on the film is read entirely and with precision. Now, cine films are rapidly scratched, after several projections, and these longitudinal scratches may lead to a defective identification of the longitudinal framing pattern, if the scratch is produced in the zone of this pattern, or to a loss of certain coded information.

It is an object of the present invention to overcome these drawbacks by providing a process which makes it possible, during projection of the film, both considerably to facilitate reading of the dots or "optical bits" constituting the coded information and to ensure in reliable manner servo-control between the cine film and the sound recording support, even if that zone of the film bearing the coded information presents scratches.

SUMMARY OF THE INVENTION

To that end, this process for recording, on the marginal part of a perforated cinematographic film, coded information or "addresses" associated respectively with the various images of the film, in the form of dots disposed in a matrix of longitudinal rows and of transverse columns, in which, before each matrix of dots corresponding to a group of coded information or "address" of an image, a transverse framing pattern constituted by a single combination of dots, is recorded, then, during the recording, in the different transverse columns, of the different successive characters constituting the same "address", a longitudinal framing pattern is recorded, along a longitudinal row bordering the matrix, this longitudinal framing pattern being constituted by an alternation, along said row, of dots and absences of dots aligned respectively with the various transverse columns of the matrix, the dots being recorded on the film by means of a recording device constituted by a transverse assembly of adjacent light sources illuminating the film respectively at the location of each longitudinal row, is characterized in that, in order to form the dots on the film, the light sources are energized by pairs of adjacent sources so as to form on the film, for each element of information, a transverse dot occupying the location of two longitudinal rows, in other words having a length of a pitch corresponding to the total width of two adjacent rows, and the successive groups of information or "addresses" are recorded, offsetting them alternately by a half-pitch in the transverse direction.

The process according to the invention offers the advantage that each dot or "optical bit" is easily recognizable and detectable, thanks to its relatively large extension. This makes it possible to avoid using a sophisticated optical system for reading the information. In fact, it suffices to use, to that end, a reader of appropriate type, for example of the CCD type, located behind the film, and a sufficiently narrow light source such as an electroluminescent diode located in front of the film, the width of this light source having to be small with respect to the length of each elementary dot. The reader of the CCD type then exploits the shadow borne by each dot on the film to indicate the presence of this dot. The reader used for detecting the dots is therefore considerably simplified.

Furthermore, since the "addresses" or successive groups of information are offset alternately by a half-pitch in the transverse direction, a longitudinal scratch on the film does not prevent the longitudinal framing patterns from being found, even if one out of two of these patterns has been deleted due to the presence of the longitudinal scratch. If a scratch is present on a zone corresponding to several images, the lacking information can be reconstituted by correlation. In fact, the "addresses" or groups of coded information associated respectively with the successive images of the film are relatively coherent. Consequently, there is no need, for each image, to have the veritable information associated with this image: it suffices to have it for example every ten images. Consequently, once the longitudinal framing pattern of certain images has been read, despite the presence of a longitudinal scratch extending over several images, it is possible to ensure a complete synchronization of the advance of the sound recording support with that of the film.

BRIEF DESCRIPTION OF THE DRAWINGS

The invention will be more readily understood on reading the following description with reference to the accompanying drawings, in which:

FIG. 1 is a schematic plan view, on a large scale, of the perforated marginal part of a cinematographic film on which successive coded information is recorded by the process according to the invention.

FIG. 2 is a block diagram of a device for reading the coded information borne by the film.

DETAILED DESCRIPTION OF THE DRAWINGS

Referring now to the drawings, the recording process according to the invention is provided to record, in the marginal part of a cinematographic film 1, on which are recorded successive images 1a, 1b, 1c, etc., coded information which corresponds to information relative to the shooting of a filmed sequence (for example the GMT at which each image of a sequence was shot, the diaphragm of the lens used, etc.). Such information is recorded in the spaces between the successive perforations 2 of the film when said film has a width of 16 mm. In the case of a 35 mm film, the coded information is recorded in the zone included between the edge of the film and the perforations 2, several of these perforations corresponding to one and the same image. The successive blocks of information A1, A2, B1, B2, C1, etc. are recorded on film 2 by means of a recording device 3 extending transversely opposite the marginal part of the film and which compress a succession of adjacent light sources 3a, 3b, . . . 3g, for example seven in number in the present example. The light sources 3a . . . 3g which may be constituted by electroluminescent diodes are connected to a writing device 4 so as to be energized and illuminated selectively, at a given instant, depending on the information character having to be recorded on the film. The information is thus recorded on film 1 in the form of combinations of "optical bits" or dots 5 formed on the film 1 following the selective illumination of the light sources of the recording device 3. Each of the blocks of information A1, A2, etc. thus comprises a certain number of dots distributed in a matrix arrangement with thirteen transverse columns and seven longitudinal rows a, b, c, d, e, f,g, for example. Dots 5 which thus define the different characters of each block of information are framed and located in position by two recognition or framing patterns, namely a transverse framing pattern 6 which is composed by an alternation of dots located in the same transverse column which is the first column of the corresponding information block, and a longitudinal framing pattern 7 which is constituted by an alternation of dots and absences of dots distributed longitudinally in a row bordering the matrix. These transverse and longitudinal framing patterns 6 and 7 are recorded on film 1 by appropriately energizing the electroluminescent diodes 3a-3g of the recording device 3. This recording mode is described in detail in U.S. Pat. No. 4,659,198.

According to the invention, the dots 5 of the information characters and the dots of the two framing patterns 6 and 7 are each constituted by two joined elementary dots so as to form a dot or an "optical bit" of width p corresponding to double the width of each longitudinal row a–g. Consequently, the initial recording system with seven longitudinal rows a–g corresponding to the seven light sources 3a–3g of the recording device 3 is changed into a recording system with three double rows, one elementary row thus remaining unused.

However, it goes without saying that the initial recording system with seven rows and thirteen columns may, if desired, be used for recording other information which is coded or even clear, i.e. able to be read by the naked eye, defined by an assembly of points distributed at the intersections of the rows and columns.

Since, by using the recording process according to the invention, the number of dots or "optical bits" 5 available for defining each information block is reduced two successive spaces between the perforations 2 may be used for recording a complete piece of information or "address" concerning an image. For example, the Figure shows by way of illustration a piece of information relative to image 1a which is distributed in two blocks A1 and A2, and a following piece of information relative to image 1c, which is distributed between two blocks B1 and B2, and so on.

In order to increase safety in reading the dots or "optical bits", it has also been provided, in accordance with a complementary feature of the invention, to offset the successive coded information alternately, in the transverse direction, by a half-pitch p/2. In other words, in the first piece of coded information formed by blocks A1, A2, the longitudinal framing pattern 7 is recorded in rows f and g, whilst the two dots of the transverse framing pattern 6 are recorded on the one hand in rows b and c and, on the other hand, in rows f and g. On the contrary, in the second piece of coded information constituted by the two blocks of information B1, B2, this information is offset as a whole transversely by a half-pitch p/2, in other words the longitudinal framing pattern 7 is recorded in rows e and f, whilst the transverse framing pattern 6 is constituted by two dots recorded on the one hand in rows a and b, on the other hand, in rows e and f.

Consequently, if the marginal part of the film has been scratched rapidly due to repeated use of the film, a longitudinal scratch in this marginal part, scratch whose width is generally less than a half-pitch p/2, does not disturb reading of the information. In fact, even if a scratch affects rows f and g to the point of destroying the longitudinal framing pattern 7 of the blocks of information A1, A2, it is possible to find this framing pattern again in the zone of the following piece of information such as blocks B1, B2, in which the unaltered row e makes it possible to reconstitute the longitudinal framing pattern.

FIG. 2 illustrate the advantage procured by the use, for recording information on film 1, of dots 5 of length equal to double the width of a longitudinal row. In fact, thanks to this arrangement, an elongated reader 8 may be used, for example of the CCD type, constituted by a succession of adjacent photosensitive cells, disposed on one side of the film, and by a sufficiently narrow light emitter 9 located on the other side of the film. The width x of this light emitter 9 must be less than the length p of each of the dots or "optical bits" 5. This emitter 9 thus projects the shadow of each dot or "optical bit" 5 onto a part of the reader 8 and the presence of dots 5 of length p on film 1 may thus be detected by very simple means, with a view to decoding the information recorded on the film.

What is claimed is:

1. A process for recording, on the marginal part of a perforated cinematographic film, coded information or "addresses" associated respectively with the various images of the film, in the form of dots disposed in a matrix of longitudinal rows and of transverse columns, in which, before each matrix of dots corresponding to a group of coded information or "address" of an image, a transverse framing pattern constituted by a single combination of dots, is recorded, then, during the recording, in the different transverse columns, of the different successive characters constituting the same "address", a longitudinal framing pattern is recorded, along a longitudinal row bordering the matrix, this longitudinal framing pattern being constituted by an alternation, along said row, of dots and absences of dots aligned respectively with the various transverse columns of the matrix, the dots being recorded on the film by means of a recording device constituted by a transverse assembly of adjacent light sources illuminating the film respectively at the location of each longitudinal row, wherein, in order to form the dots on the film, the light sources are energized by pairs of adjacent sources so as to form on the film, for each element of information, a transverse dot occupying the location of two longitudinal rows, in other words having a length of a pitch corresponding to the total width of two adjacent rows, and the successive groups of information or "addresses" are recorded, offsetting them alternately by a half-pitch in the transverse direction.

* * * * *